United States Patent
Zhao et al.

(10) Patent No.: US 11,930,395 B2
(45) Date of Patent: *Mar. 12, 2024

(54) METHOD OF TRANSMITTING DATA, USER EQUIPMENT, NETWORK SIDE DEVICE AND COMPUTER READABLE STORAGE MEDIUM

(71) Applicant: DATANG MOBILE COMMUNICATIONS EQUIPMENT CO., LTD., Beijing (CN)

(72) Inventors: Yali Zhao, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 66 days.

This patent is subject to a terminal disclaimer.

(21) Appl. No.: 17/394,316

(22) Filed: Aug. 4, 2021

(65) Prior Publication Data

US 2021/0368386 A1 Nov. 25, 2021

Related U.S. Application Data

(63) Continuation of application No. 16/497,408, filed as application No. PCT/CN2018/078990 on Mar. 14, 2018, now Pat. No. 11,109,266.

(30) Foreign Application Priority Data

Mar. 24, 2017 (CN) .......................... 201710183006.0

(51) Int. Cl.
*H04W 80/08* (2009.01)
*H04W 8/24* (2009.01)
(Continued)

(52) U.S. Cl.
CPC ............. *H04W 28/04* (2013.01); *H04W 8/24* (2013.01); *H04W 28/0278* (2013.01);
(Continued)

(58) Field of Classification Search
CPC ... H04W 28/04; H04W 8/24; H04W 28/0278; H04W 28/06; H04W 28/085;
(Continued)

(56) References Cited

U.S. PATENT DOCUMENTS

| | | |
|---|---|---|
| 2012/0099452 A1 | 4/2012 | Dai et al. |
| 2014/0056278 A1 | 2/2014 | Marinier et al. |

(Continued)

FOREIGN PATENT DOCUMENTS

| | | |
|---|---|---|
| CN | 101166193 A | 4/2008 |
| CN | 101932019 A | 12/2010 |

(Continued)

OTHER PUBLICATIONS

MediaTek Inc., "Deployment scenarios of FDD-TDD joint operation", R1-133288, 3GPP TSG RAN WG1 Meeting #74, Barcelona, Spain, Aug. 19-23, 2013, all pages.

(Continued)

*Primary Examiner* — Edan Orgad
*Assistant Examiner* — Malick A Sohrab
(74) *Attorney, Agent, or Firm* — Ladas & Parry, LLP (57) ABSTRACT

A method of transmitting data, a UE, a network side device and a computer readable storage medium are provided. The method of transmitting data is applicable to the UE and includes: transmitting, by the UE, duplicated transmission data to different radio link control (RLC) entities respectively when a network side configures or activates a packet duplication mode for a bearer; transmitting, by one of the different RLC entities, the transmission data through one of logical channels to a master medium access control (MAC)

(Continued)

entity and transmitting, by each of the others of the different RLC entities, the transmission data through a different one of the logical channels to a different one of one or more secondary MAC entities; and transmitting, by the master MAC entity and the one or more secondary MAC entities, the transmission data to the network side through different carriers.

16 Claims, 4 Drawing Sheets

(51) Int. Cl.
*H04W 28/02* (2009.01)
*H04W 28/04* (2009.01)
*H04W 28/06* (2009.01)
*H04W 28/082* (2023.01)
*H04W 80/02* (2009.01)

(52) U.S. Cl.
CPC ......... *H04W 28/06* (2013.01); *H04W 28/082* (2023.05); *H04W 80/02* (2013.01); *H04W 80/08* (2013.01)

(58) Field of Classification Search
CPC ..... H04W 80/02; H04W 80/08; H04W 28/02; H04W 76/15; H04W 72/0453; H04W 72/1221; H04W 72/1263; H04W 72/1205; H04W 28/0252; H04L 1/08; H04L 5/0035; H04L 5/0098; H04L 5/001; H04L 5/0001; H04L 5/003
See application file for complete search history.

(56) References Cited

U.S. PATENT DOCUMENTS

| | | | |
|---|---|---|---|
| 2015/0181638 A1 | 6/2015 | Tabet et al. | |
| 2015/0305034 A1 | 10/2015 | Balachandran et al. | |
| 2016/0037526 A1 | 2/2016 | Kim et al. | |
| 2016/0094446 A1* | 3/2016 | Kazmi | H04W 28/0289 370/392 |
| 2019/0098606 A1* | 3/2019 | Sharma | H04B 7/0404 |
| 2019/0268799 A1* | 8/2019 | Hong | H04W 4/70 |
| 2019/0327607 A1* | 10/2019 | Xiao | H04L 5/0053 |
| 2020/0029379 A1* | 1/2020 | Xiao | H04L 1/22 |
| 2020/0059821 A1* | 2/2020 | Wirth | H04W 80/02 |
| 2020/0275315 A1* | 8/2020 | Futaki | H04W 28/0864 |
| 2021/0112610 A1* | 4/2021 | Xiao | H04L 1/1614 |

FOREIGN PATENT DOCUMENTS

| | | |
|---|---|---|
| CN | 102348292 A | 2/2012 |
| CN | 104349461 A | 2/2015 |
| CN | 104604318 A | 5/2015 |
| CN | 105191179 A | 12/2015 |
| CN | 2016518062 A | 6/2016 |
| CN | 106231637 A | 12/2016 |
| WO | 2017/0014572 A1 | 1/2017 |

OTHER PUBLICATIONS

Pantech, "CN split without data forwarding in the retransmission buffer", R2-131094, 3GPP TSG RAN WG2 Meeting #81 bis, Chicago, USA, Apr. 15-19, 2013, all pages.
Huawei, HiSilicon, "MAC Structure and Operation for URLLC", R2-1700176, 3GPP TSG-RAN WG2 NR Ad Hoc, Spokane, USA, Jan. 17-19, 2017, all pages.
LG Electronics, "Packet duplication in NR", R2-1700423, 3GPP TSG-RAN WG2 NR Ad Hoc, Spokane, USA, Jan. 17-19, 2017, all pages.
InterDigital Communications, "Packet Duplication at PDCP", R2-1701186, 3GPP TSG-RAN WG2 Meeting #97, Athens, Greece, Feb. 13-17, 2017 all pages.
LG Electronics Inc., "Packet duplication in PDCP", R2-1701462, 3GPP TSG-RAN WG2 Meeting #97, Athens, Greece, Feb. 13-17, 2017 all pages.
LG Electronics Inc., "Packet duplication in CA" R2-1701542, 3GPP TSG-RAN WG2 Meeting #97, Athens, Greece, Feb. 13-17, 2017 all pages.
Intel Corporation, "Enhancements of SR/BSR in NR", R2-1701723, 3GPP TSG-RAN WG2 Meeting #97, Athens, Greece, Feb. 13-17, 2017 all pages.
Ericsson, "Data duplication in lower layers (HARQ)", Tdoc R2-1702032 (revision of R2-1700833, 3GPP TSG-RAN WG2 Meeting #97, Athens, Greece, Feb. 13-17, 2017 all pages.
First Office Action and Search Report from CN app. No. 201710183006. 0, dated Jan. 21, 2020, with English translation from Global Dossier, all pages.
Notice of Reason for Refusal from JP app. No. 2019-552514, dated Dec. 8, 2020, with English translation from Global Dossier, all pages.
Non-Final Office Action from U.S. Appl. No. 16/497,408, dated Sep. 23, 2020, all pages.
Extended European Search Report from EP app. No. 18770717.9, dated Feb. 11, 2020, all pages.
Decision of Refusal from JP app. No. 2019-552514, dated Aug. 24, 2021, with English translation from Global Dossier, all pages.

* cited by examiner

METHOD OF TRANSMITTING DATA, USER EQUIPMENT, NETWORK SIDE DEVICE AND COMPUTER READABLE STORAGE MEDIUM

CROSS-REFERENCE TO RELATED APPLICATIONS

The present application claims the benefit of and is a continuation application of U.S. patent application Ser. No. 16/497,408 filed on Sep. 24, 2019 which is the U.S. national phase of PCT Application No. PCT/CN2018/078990 filed on Mar. 14, 2018, which claims a priority of the Chinese patent application No. 201710183006.0 filed in China on Mar. 24, 2017, the disclosure of which are incorporated herein by reference in their entireties.

TECHNICAL FIELD

This disclosure relates to the field of communication technology, in particular to a method of transmitting data, a User Equipment (UE), a network side device and a computer readable storage medium.

BACKGROUND

5G New Radio (NR) systems mainly support three types of services: 1) enhanced Mobile Broadband (eMBB); 2) massive Machine Type Communications (mMTC); and 3) Ultra-Reliable and Low Latency Communications). For URLLC, a solution proposed by 3GPP to address URLLC's high demand in terms of latency and reliability is packet duplication, i.e., transmitting the same transmission data through a plurality of logical channels, so as to improve transmission reliability and reduce transmission latency.

Figure 1:
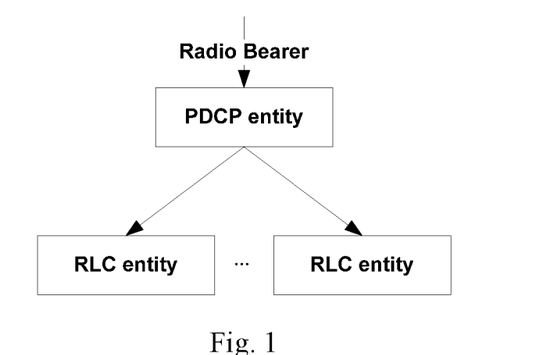
FIG. 1 is a schematic diagram of the packet duplication model in a related art.

Referring to FIG. 1, a schematic diagram showing the packet duplication model in related art is illustrated, in which a packet duplication based on Packet Data Convergence Protocol (PDCP) layer is taken as an example. It can be seen from FIG. 1 that one Radio Bearer (RB) of PDCP layer (each RB corresponds to one PDCP entity) is transmitted through a plurality of logical channels in Radio Link Control (RLC) layer respectively (each logical channel corresponds to one RLC entity). However, there is no conclusive answer to the problem as to how to transmit a bearer for which packet duplication is enabled in Medium Access Control (MAC) layer.

SUMMARY

In view of above mentioned, this disclosure provides a method of transmitting data, a UE and a network side device so as to address the problem as to how to transmit a bearer for which packet duplication is enabled in the MAC layer.

To solve the aforementioned technical problem, this disclosure provides a method of transmitting data applied to a UE including: transmitting, by the UE, duplicated transmission data to different radio link control (RLC) entities respectively when a network side configures or activates a packet duplication mode for a bearer; transmitting, by one of the different RLC entities, the transmission data through one of logical channels to a master medium access control (MAC) entity and transmitting, by each of the others of the different RLC entities, the transmission data through a different one of the logical channels to a different one of one or more secondary MAC entities; and transmitting, by the master MAC entity and the one or more secondary MAC entities, the transmission data to the network side through different carriers.

Optionally, each of the logical channels corresponds to one RLC entity and each of the logical channels corresponds to one MAC entity.

Optionally, the one or more secondary MAC entities are established together with the master MAC entity.

Optionally, the method further includes: establishing, the UE, the one or more secondary MAC entities corresponding to the bearer for which packet duplication mode is configured or activated when the network side configures or activates the packet duplication mode for the bearer.

Optionally, the method further includes: releasing, by the UE, the one or more secondary MAC entities corresponding to the bearer for which packet duplication mode is configured or activated when the network side deconfigures or deactivates the packet duplication mode for the bearer.

Optionally, prior to the transmitting, by the UE, the duplicated transmission data to the different RLC entities respectively, the method further includes: receiving a mapping between the carriers and the master MAC entity and the one or more secondary MAC entities that is configured by the network side semi-statically or dynamically.

Optionally, prior to the transmitting, by the UE, the duplicated transmission data to the different RLC entities respectively, the method further includes: receiving a mapping between the logical channels and the master MAC entity and the one or more secondary MAC entities or a mapping between the logical channels and the carriers that is configured by the network side semi-statically or dynamically.

Optionally, both the master MAC entity and the one or more secondary MAC entities are configured to bear a logical channel corresponding to a bearer for which packet duplication mode is not configured or activated and logical channels corresponding to a bearer for which packet duplication mode is configured or activated.

Optionally, when one of the one or more secondary MAC entities is released, the logical channel corresponding to the bearer for which packet duplication mode is not configured or activated that is borne on the released one of the one or more secondary MAC entities is automatically transferred to be borne on the master MAC entity.

Optionally, the master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

Optionally, the method further includes: determining whether to trigger a buffer state reporting (BSR); and reporting to the network side buffer sizes of the logical channels or logical channel groups corresponding to the master MAC entity and the one or more secondary MAC entities when it is determined the BSR is to be triggered.

Optionally, the determining whether to trigger the BSR is performed based on the UE.

Optionally, the reporting to the network side the buffer sizes of the logical channels or logical channel groups corresponding to the master MAC entity and the one or more secondary MAC entities includes: reporting to the network side the buffer sizes of the logical channels or logical channel groups corresponding to the master MAC entity and the one or more secondary MAC entities by using a carrier corresponding to any one MAC entity of the master MAC entity and the one or more secondary MAC entities.

Optionally, the reporting to the network side the buffer sizes of the logical channels or logical channel groups corresponding to the master MAC entity and the one or more secondary MAC entities includes: reporting to the network side the buffer sizes of the logical channels or logical channel groups corresponding to the master MAC entity and the one or more secondary MAC entities through one BSR MAC CE.

Optionally, the reporting to the network side the buffer sizes of the logical channels or logical channel groups corresponding to the master MAC entity and the one or more secondary MAC entities includes: reporting to the network side the buffer sizes of the logical channels or logical channel groups corresponding to the master MAC entity and the one or more secondary MAC entities through a plurality of BSR MAC CEs in one MAC PDU.

Optionally, the determining whether to trigger the BSR is performed based on a MAC entity.

Optionally, the reporting to the network side the buffer sizes of the logical channels or logical channel groups corresponding to the master MAC entity and the one or more secondary MAC entities includes: reporting to the network side the buffer sizes of the logical channels or logical channel groups corresponding to the master MAC entity and the one or more secondary MAC entities by using a carrier corresponding to the MAC entity or a carrier corresponding to other MAC entity.

Optionally, the reporting to the network side the buffer sizes of the logical channels or logical channel groups corresponding to the master MAC entity and the one or more secondary MAC entities includes: adding identification information in the BSR MAC CE to identify a correspondence between the logical channels or logical channel groups and the MAC entities when a carrier used in BSR MAC CE transmission is not limited and there is a repetition of ID among the logical channels or logical channel groups corresponding to different MAC entities.

Optionally, prior to the transmitting, by the UE, the duplicated transmission data to the different RLC entities respectively, the method further comprises: transmitting a UE capability to the network side, the UE capability carrying capability indication information indicating that the bearer using packet duplication mode is supported.

This disclosure further provides a method of transmitting data applied to a network side device including: receiving, by a master medium access control (MAC) entity and one or more secondary MAC entities of a network side device, duplicated transmission data transmitted by a user equipment (UE) through different carriers when a packet duplication mode is configured or activated for a bearer; transmitting, by the master MAC entity and the one or more secondary MAC entities, the transmission data to different radio link control (RLC) entities through different logical channels; and transmitting, by the RLC entities, received transmission data to a Packet Data Convergence Protocol (PDCP) entity.

Optionally, each of the logical channels corresponds to one RLC entity and each of the logical channels corresponds to one MAC entity.

Optionally, bearer duplication is performed by the PDCP entity or a protocol layer on top of PDCP layer.

Optionally, the one or more secondary MAC entities are established together with the master MAC entity.

Optionally, the method further includes: establishing the one or more secondary MAC entities corresponding to the bearer for which packet duplication mode is configured or activated when the packet duplication mode for the bearer is configured or activated; or establishing the one or more secondary MAC entities corresponding to the bearer for which the packet duplication mode is configured or activated when the network side device configures or activates packet duplication mode for a first UE of all UEs served by the network side device.

Optionally, the method further includes: releasing the one or more secondary MAC entities corresponding to the bearer for which packet duplication mode is configured or activated when the packet duplication mode for the bearer is deconfigured or deactivated; or releasing the one or more secondary MAC entities corresponding to the bearer for which packet duplication mode is configured or activated when the packet duplication mode for a last bearer for which packet duplication mode is configured or activated of all bearers served by the network side device is deconfigured or deactivated.

Optionally, the method further includes: setting semi-statically or dynamically a mapping between the carriers and the master MAC entity and the one or more secondary MAC entities, and transmitting the mapping to the UE when the packet duplication mode for the bearer is configured or activated.

Optionally, the method further includes: setting semi-statically or dynamically a mapping between the logical channels and the master MAC entity and the one or more secondary MAC entities or a mapping between the logical channels and the carriers, and transmitting the mapping to the UE when the packet duplication mode for the bearer is configured or activated.

Optionally, both the master MAC entity and the one or more secondary MAC entities are configured to bear a logical channel corresponding to a bearer for which packet duplication mode is not configured or activated and logical channels corresponding to a bearer for which packet duplication mode is configured or activated.

Optionally, when one of the one or more secondary MAC entities is released, the logical channel corresponding to the bearer for which packet duplication mode is not configured or activated that is borne on the released one of the one or more secondary MAC entities is automatically transferred to be borne on the master MAC entity.

Optionally, the master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

Optionally, the method further includes: receiving buffer sizes, reported by the UE, of the logical channels or logical channel groups corresponding to the master MAC entity and the one or more secondary MAC entities of the UE, and performing uplink resource scheduling based on the buffer sizes of the logical channels or logical channel groups corresponding to the master MAC entity and the one or more secondary MAC entities of the UE.

Optionally, before the packet duplication mode is configured or activated for a bearer, the method further comprises: receiving a UE capability transmitted by the UE, the UE capability carrying capability indication information indicating that the bearer using packet duplication mode is supported.

This disclosure further provides a UE, including: a first transmission module, configured to transmit duplicated transmission data to different radio link control (RLC) entities respectively when a network side configures or activates a packet duplication mode for a bearer; a second transmission module, configured to trigger one of the different RLC entities to transmit the transmission data through one of logical channels to a master medium access control (MAC) entity and transmitting, by each of the others of the different RLC entities, the transmission data through a different one of the logical channels to a different one of one or more secondary MAC entities; and a third transmission module, configured to trigger the master MAC entity and the one or more secondary MAC entities to transmit the transmission data to the network side through different carriers.

Optionally, each of the logical channels corresponds to one RLC entity and each of the logical channels corresponds to one MAC entity.

Optionally, the UE further includes: a first establishment module, configured to establish the one or more secondary MAC entities together with the master MAC entity.

Optionally, the UE further includes: a second establishment module, configured to establish the one or more secondary MAC entities corresponding to the bearer for which packet duplication mode is configured or activated when the network side configures or activates the packet duplication mode for the bearer.

Optionally, the UE further includes: a releasing module, configured to release the one or more secondary MAC entities corresponding to the bearer for which packet duplication mode is configured or activated when the network side deconfigures or deactivates the packet duplication mode for the bearer.

Optionally, the UE further includes: a first reception module, configured to receive a mapping between the carriers and the master MAC entity and the one or more secondary MAC entities that is configured by the network side semi-statically or dynamically.

Optionally, the UE further includes: a second reception module, configured to receive a mapping between the logical channels and the master MAC entity and the one or more secondary MAC entities or a mapping between the logical channels and the carriers that is configured by the network side semi-statically or dynamically.

Optionally, both the master MAC entity and the one or more secondary MAC entities are configured to bear a logical channel corresponding to a bearer for which packet duplication mode is not configured or activated and logical channels corresponding to a bearer for which packet duplication mode is configured or activated.

Optionally, the UE further includes: a transferring module, configured to automatically transfer the logical channel corresponding to the bearer for which packet duplication mode is not configured or activated that is borne on the released one of the one or more secondary MAC entities to be borne on the master MAC entity when one of the one or more secondary MAC entities is released.

Optionally, the master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

Optionally, the UE further includes: a determination module, configured to determine whether to trigger a BSR; and a reporting module, configured to report to the network side buffer sizes of the logical channels or logical channel groups corresponding to the master MAC entity and the one or more secondary MAC entities when it is determined the BSR is to be triggered.

Optionally, the determination module determines whether to trigger the BSR based on the UE.

Optionally, the reporting module is further configured to report to the network side the buffer sizes of the logical channels or logical channel groups corresponding to the master MAC entity and the one or more secondary MAC entities by using a carrier corresponding to any one MAC entity of the master MAC entity and the one or more secondary MAC entities.

Optionally, the reporting module is further configured to report to the network side the buffer sizes of the logical channels or logical channel groups corresponding to the master MAC entity and the one or more secondary MAC entities through one BSR MAC CE.

Optionally, the reporting module is further configured to report to the network side the buffer sizes of the logical channels or logical channel groups corresponding to the master MAC entity and the one or more secondary MAC entities through a plurality of independent BSR MAC CEs in one MAC PDU.

Optionally, the determination module determines whether to trigger the BSR based on a MAC entity.

Optionally, the reporting module is further configured to report to the network side the buffer sizes of the logical channels or logical channel groups corresponding to the master MAC entity and the one or more secondary MAC entities by using a carrier corresponding to the MAC entity or a carrier corresponding to other MAC entity.

Optionally, the reporting module is further configured to add identification information in the BSR MAC CE to identify a correspondence between the logical channels or logical channel groups and the MAC entities when a carrier used in BSR MAC CE transmission is not limited and there is a repetition of ID among the logical channels or logical channel groups corresponding to different MAC entities.

Optionally, the UE further includes: a UE capability transmission module, configured to transmit a UE capability to the network side, wherein the UE capability carries capability indication information indicating that the bearer using packet duplication mode is supported.

This disclosure further provides a network side device, including: a reception module, configured to trigger a master MAC entity and one or more secondary MAC entities to respectively receive duplicated transmission data transmitted by a user equipment (UE) through different carriers when a packet duplication mode is configured or activated for a bearer; a first transmission module, configured to trigger the master MAC entity and the one or more secondary MAC entities to transmit the transmission data to different radio link control (RLC) entities through different logical channels, a second transmission module, configured to trigger the RLC entities to transmit received transmission data to a Packet Data Convergence Protocol (PDCP)entity.

Optionally, each of the logical channels corresponds to one RLC entity and each of the logical channels corresponds to one MAC entity.

Optionally, the network side device further includes: a bearer duplication module, configured to trigger the PDCP entity or a protocol layer on top of PDCP layer to perform bearer duplication.

Optionally, the network side device further includes: a first establishment module, configured to establish the one or more secondary MAC entities together with the master MAC entity.

Optionally, the network side device further includes: a second establishment module, configured to establish the one or more secondary MAC entities corresponding to the bearer for which packet duplication mode is configured or activated when the packet duplication mode for the bearer is configured or activated; or a third establishment module, configured to establish the one or more secondary MAC entities corresponding to the bearer for which the packet duplication mode is configured or activated when the network side device configures or activates packet duplication mode for a first UE of all UEs served by the network side device.

Optionally, the network side device further includes: a first releasing module, configured to release the one or more secondary MAC entities corresponding to the bearer for which packet duplication mode is configured or activated when the packet duplication mode for the bearer is deconfigured or deactivated; or a second releasing module, configured to release the one or more secondary MAC entities corresponding to the bearer for which packet duplication mode is configured or activated when the packet duplication mode for a last bearer for which packet duplication mode is configured or activated of all bearers served by the network side device is deconfigured or deactivated.

Optionally, the network side device further includes: a first configuration module, configured to set semi-statically or dynamically a mapping between the carriers and the master MAC entity and the one or more secondary MAC entities, and transmitting the mapping to the UE when the packet duplication mode for the bearer is configured or activated.

Optionally, the network side device further includes: a second configuration module, configured to set semi-statically or dynamically a mapping between the logical channels and the master MAC entity and the one or more secondary MAC entities or a mapping between the logical channels and the carriers, and transmitting the mapping to the UE when the packet duplication mode for the bearer is configured or activated.

Optionally, both the master MAC entity and the one or more secondary MAC entities are configured to bear a logical channel corresponding to a bearer for which packet duplication mode is not configured or activated and logical channels corresponding to a bearer for which packet duplication mode is configured or activated.

Optionally, the network side device further includes: a transferring module, configured to automatically transfer the logical channel corresponding to the bearer for which packet duplication mode is not configured or activated that is borne on the released one of the one or more secondary MAC entities to be borne on the master MAC entity when one of the one or more secondary MAC entities is released.

Optionally, the master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

Optionally, the network side device further includes: a scheduling module, configured to receive buffer sizes, reported by the UE, of the logical channels or logical channel groups corresponding to the master MAC entity and the one or more secondary MAC entities of the UE, and perform uplink resource scheduling based on the buffer sizes of the logical channels or logical channel groups corresponding to the master MAC entity and the one or more secondary MAC entities of the UE.

Optionally, the network side device further includes: a UE capability reception module, configured to receive a UE capability transmitted by the UE, wherein the UE capability carries capability indication information indicating that the bearer using packet duplication mode is supported.

This disclosure further provides a computer readable storage medium storing therein a computer program, wherein the computer program is configured to be executed by a processor, to implement steps of the methods for transmitting data described above.

This disclosure further provides a UE, including a processor and a memory, wherein the processor is configured to read and execute a program stored in the memory to implement steps of the method for transmitting data applied to the UE described above.

This disclosure further provides a network side device, including a processor and a memory, wherein the processor is configured to read and execute a program stored in the memory to implement steps of the method for transmitting data applied to the network side device described above.

The aforementioned technical solutions of this disclosure have beneficial effects as follows: by introducing MAC entities equal in quantity to the logical channels corresponding to the bearer for which packet duplication mode is enabled, it is guaranteed that each of the logical channels corresponding to the bearer for which packet duplication mode is enabled is scheduled and transmitted through a different MAC entity, thereby due to multiplexing gain, transmission quality following the duplication is ensured, and packet transmission latency is reduced.

DETAILED DESCRIPTION

In order to make the objectives, the technical solutions and advantages of embodiments of this disclosure clearer, the technical solutions of embodiments of this disclosure will be described clearly and completely in conjunction with drawings in the embodiments of the present disclosure hereinafter. Apparently, the described embodiments are merely a part of rather than all the embodiments of this disclosure. All other embodiments obtained by a person ordinary skilled in the art based on the embodiments of this disclosure fall within the protection scope of this disclosure.

Figure 5:
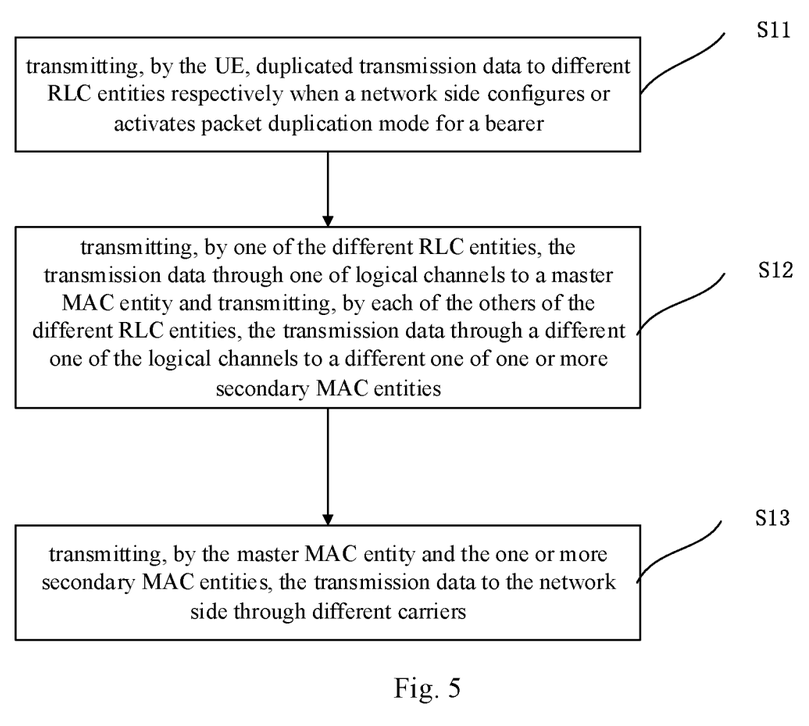
FIG. 5 is a schematic flow diagram showing a method of transmitting data applied to UE side according to some embodiments of this disclosure.

Referring to FIG. 5, a schematic flow diagram showing a method of transmitting data applied to a UE side according to some embodiments of this disclosure is illustrated, where the method includes the following steps.

Step S11: transmitting, by the UE, duplicated transmission data to different RLC entities respectively when a network side configures or activates packet duplication mode for a bearer.

Step S12: transmitting, by one of the different RLC entities, the transmission data through one of logical channels to a master MAC entity and transmitting, by each of the others of the different RLC entities, the transmission data through a different one of the logical channels to a different one of one or more secondary MAC entities.

Step S13: transmitting, by the master MAC entity and the one or more secondary MAC entity, the transmission data to the network side through different carriers.

In some embodiments of this disclosure, by introducing MAC entities equal in quantity to the logical channels corresponding to the bearer for which packet duplication mode is enabled, it is guaranteed that each of the logical channels corresponding to the bearer for which packet duplication mode is enabled is scheduled and transmitted through a different MAC entity, thereby due to multiplexing gain, transmission quality following the duplication is ensured, and packet transmission latency is reduced.

In some embodiments of this disclosure, the packet duplication mode may be valid in the following two manners: valid upon configuration; and being configured first, then valid upon activation.

In some embodiments of this disclosure, duplication of transmission data may be performed by the PDCP entity or a protocol layer on top of PDCP layer.

In some embodiments of this disclosure, the bearer for which packet duplication mode is enabled corresponds to at least two logical channels, where each of the logical channels corresponds to one RLC entity and each of the logical channels corresponds to one MAC entity.

In some embodiments of this disclosure, the first MAC entity established by the UE is called master MAC entity and other MAC entities are called secondary MAC entities.

In some embodiments of this disclosure, the secondary MAC entities may be established in one of the following conditions (but not limited thereto).

1) The secondary MAC entities are established together with the master MAC entity.

In some embodiments of this disclosure, in a UE supporting a bearer for which packet duplication mode is enabled, the secondary MAC entities and the master MAC entity may be established and released together, and the UE always maintains the master MAC entity and the secondary MAC entities simultaneously, no matter whether packet duplication mode is configured or activated for the bearer.

2) The UE establishes the secondary MAC entities corresponding to the bearer for which packet duplication mode is enabled when the network side configures or activates packet duplication mode for the bearer.

In the case that the secondary MAC entities are established in the condition 2), the secondary MAC entities may be released in the following condition (but not limited thereto): when the network side deconfigures or deactivates packet duplication mode for the bearer, the UE releases the secondary MAC entities corresponding to the bearer for which packet duplication mode is enabled.

In some embodiments of this disclosure, in a UE supporting a bearer for which packet duplication mode is enabled, the master MAC entity is always maintained by the UE, however the secondary MAC entities are established or released according to whether packet duplication mode is configured or activated for the bearer.

In some embodiments of this disclosure, the UE and the network side are kept in conformity in regard to the establishment or release mode of the secondary MAC entities, where the conformity may be maintained through protocol specification or signaling notification.

In some embodiments of this disclosure, a mapping between the carriers and the master MAC entity and the secondary MAC entities may be configured by the network side semi-statically or dynamically and transmitted to the UE.

Optionally, in the case that the network side configures semi-statically the mapping between the carriers and the master MAC entity and the secondary MAC entities and transmits the mapping to the UE, the mapping may be transmitted to the UE through Radio Resource Control (RRC) signaling semi-statically.

Optionally, in the case that the network side configures dynamically the mapping between the carriers and the master MAC entity and the secondary MAC entities and transmits the mapping to the UE, the mapping may be transmitted to the UE through L1/L2 signaling dynamically.

That is, in some embodiments of this disclosure, prior to the UE transmitting the duplicated transmission data to the different RLC entities respectively, the method further includes: receiving the mapping between the carriers and the master MAC entity and the secondary MAC entities that is configured by the network side semi-statically or dynamically.

In some embodiments of this disclosure, a mapping between the logical channels and the master MAC entity and the secondary MAC entities or a mapping between the logical channels and the carriers may be configured by the network side semi-statically or dynamically and transmitted to the UE.

Optionally, in the case that the network side configures semi-statically the mapping between the logical channels and the master MAC entity and the secondary MAC entities or the mapping between the logical channels and the carriers and transmits the mapping to the UE, the mapping may be transmitted to the UE through RRC signaling semi-statically.

Optionally, in the case that the network side configures dynamically the mapping between the logical channels and the master MAC entity and the secondary MAC entities or the mapping between the logical channels and the carriers and transmits the mapping to the UE, the mapping may be transmitted to the UE through L1/L2 signaling dynamically.

That is, in some embodiments of this disclosure, prior to the UE transmitting the duplicated transmission data to the different RLC entities respectively, the method further includes: receiving the mapping between the logical channels and the master MAC entity and the secondary MAC entities or the mapping between the logical channels and the carriers that is configured by the network side semi-statically or dynamically.

In some embodiments of this disclosure, the master MAC entity and the secondary MAC entities may be used according to one of the following rules (but not limited thereto).

1) Both the master MAC entity and the secondary MAC entities are configured to bear a logical channel corresponding to a bearer for which packet duplication mode is not configured or activated and logical channels corresponding to a bearer for which packet duplication mode is configured or activated.

In this case, optionally, when one of the secondary MAC entities is released, the logical channel corresponding to the bearer for which packet duplication mode is not configured or activated that is borne on the released MAC entity is automatically transferred to be borne on the master MAC entity, with no additional signaling configuration required.

2) The master MAC entity is configured to bear a logical channel corresponding to a bearer for which packet duplication mode is not configured or activated and logical channels corresponding to a bearer for which packet duplication mode is configured or activated; and the secondary MAC entities are configured to only bear logical channels corresponding to a bearer for which packet duplication mode is configured or activated.

In some embodiments of this disclosure, prior to transmitting the transmission data to the network side device, the UE may perform a BSR reporting. Hereinafter, how the UE performs the BSR in some embodiments of this disclosure is detailed.

First, the BSR mechanism in the Long Term Evolution (LTE) system is briefly introduced.

All LTE systems are based on scheduling, where eNodeB (eNB) allocates to UE time-frequency resources required for data transmission, and UE conducts Downlink (DL) data reception or Uplink (UL) data transmission based on the scheduling command of eNB. The UL data transmission is scheduled by eNB, where an eNB scheduler determines the UL resource allocation and then informs UE of the allocation result through UL grant. The eNB scheduler allocates the UL resources based on the UL data amount to be transmitted by the UE, i.e., the UE buffer state. Since the buffer is located at the UE side, in order to make the information available to the eNB, UE must perform a BSR reporting toward eNB. The BSR mechanism of LTE Rel-11 and previous releases is as follows.

1. Granularity of BSR

BSR of LTE system is based on Logical Channel Group (LCG). Four LCGs are defined in total. LCG ID corresponding to the bearer/logical channel is configured during bearer establishment procedure.

2. RRC Layer BSR Related Parameter Configuration

In LTE system, the RRC layer parameters directed to BSR configuration include the following timers, both of which are configured and maintained based on UE: 1) retxBSR-Timer: the timer prohibits BSR reporting; 2) periodicBSR-Timer: the timer controls the periodic BSR reporting.

3. Categories of BSRs and Trigger Mechanism Thereof

1) Regular BSR: (1) triggered if data with higher priority than those waiting in the buffer arrive or data arrive at empty buffer; (2) triggered when the retxBSR-Timer expires and there are data in the buffer.

2) Periodic BSR: triggered when the periodicBSR-Timer expires.

3) Padding BSR: may be triggered if there is still resource available after resources are allocated for to-be-transmitted data during MAC PDU construction by UE.

4. Principle of BSR Reporting

For Regular BSR and Periodic BSR, if more than one LCG has data available, the UE reports a long BSR, else reports a short BSR.

For Padding BSR, if the number of padding bits is equal to or larger than (short BSR+MAC sub-header) but smaller than (long BSR+MAC sub-header), if more than one LCG has data available, the UE reports a truncated BSR, else reports a short BSR; if the number of padding bits is equal to or larger than (long BSR+MAC sub-header), reports a long BSR.

When a BSR is triggered, both Periodic BSR and Padding BSR may be reported only if there are UL resources available; for Regular BSR, if there is no UL resource available, a Scheduling Request is triggered to request eNB to allocate UL resources for UE.

After eNB has allocated UL resources to UE, if the resources are just enough for the transmission of all UL data, BSR is not transmitted, instead the UL data are transmitted directly; if the resources are not enough for the transmission of all UL data, Regular BSR or Periodic BSR are reported preferentially, then eNB performs transmission scheduling subsequently based on the UL data amount to be transmitted by UE reported in the BSR.

One MAC PDU contains at most one BSR. The priority of BSRs is: Regular BSR=Periodic BSR>Padding BSR. If multiple BSRs are triggered at the same time, only the BSR with the highest priority is reported. Since Regular BSR and Periodic BSR are the same in terms of report content (both contain data amount information of all data available for transmission in UE buffer) and report format, the choice between Regular BSR and Periodic BSR is arbitrary. During the construction of MAC PDU at MAC layer, these two types of MAC Control Elements (CE) are placed preferentially, and then MAC Service Data Unit (SDU) is placed.

Padding BSR has a lower priority than data. Padding BSR and Regular/Periodic BSR may be reported in different MAC PDUs in the same sub-frame.

5. Procedure Following the BSR Reporting

As long as a BSR is triggered and can be reported, the periodicBSR-Timer and retxBSR-Timer are started or restarted. However, it is noted, for truncated BSR, the periodicBSR-Timer may not be started or restarted, and only the retxB SR-Timer is started or restarted.

6. BSR Format

BSR is reported in the form of MAC CE, which may be divided into MAC sub-header and MAC CE. BSR MAC CE has two formats: long BSR and short BSR, where truncated BSR has the same format as the short BSR.

Figure 2:
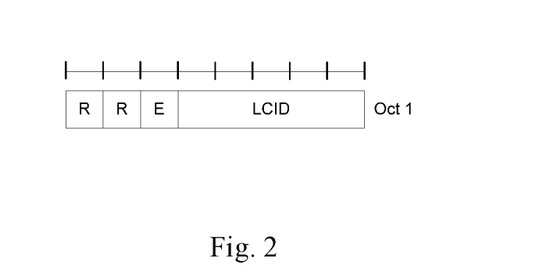
FIG. 2 is a schematic diagram of a format of a MAC sub-header in a related art.
Figure 3:
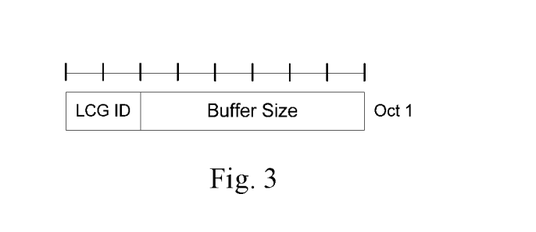
FIG. 3 is a schematic diagram of a format of a short BSR MAC CE or a truncated BSR MAC CE in a related art.
Figure 4:
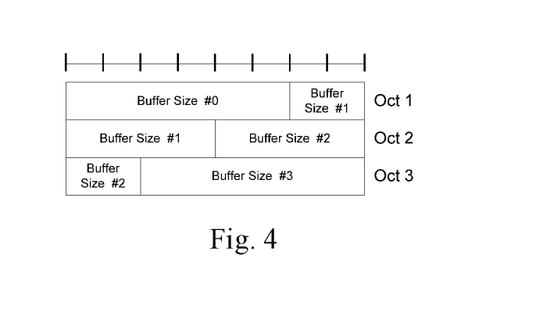
FIG. 4 is a schematic diagram of a format of a long BSR MAC CE in a related art.

The formats of MAC sub-header and BSR MAC CE in LTE system are as shown in FIG. 2 to FIG. 4.

The fields therein are defined as follows.

Logical Channel ID (LCID): this field indicates logical channel ID of corresponding load, where long BSR, short BSR and truncated BSR each has one LCD.

E: extended bit, used to indicate the next byte is MAC sub-header or MAC load.

R: reserved bit.

LCG ID: logical channel group ID. Four logical channel groups are defined for BSR in LTE system.

Buffer Size: amount of data of corresponding logical channel group in the buffer.

As far as BSR reporting is concerned, the distinction between LTE R10/11 and LTE R8/9 consists in that, in the R10/11, a new BS table is introduced since carrier aggregation is supported and as a result peak rate is increased. When a UE supporting R10/11 reports a BSR, whether the new BS table is utilized is configured by eNB through RRC signaling. Whether the BS table in LTE R8/9 or the BS table in LTE R10/11 is quantized in 64 levels, i.e., corresponding quantized value may be represented by 6 bits. As a result, the field buffer size of each LCG in the above BSR MAC CE format consists of 6 bits.

In some embodiments of this disclosure, the method of transmitting data further includes the followings steps.

1) Determining whether to trigger a BSR.

2) In the case that it is determined the BSR is to be triggered, reporting to the network side buffer sizes of the logical channels or logical channel groups corresponding to the master MAC entity and the one or more secondary MAC entities.

In some embodiments of this disclosure, determining whether to trigger the BSR may be performed in the following two ways (but not limited thereto).

One way of determining whether to trigger the BSR is: determining whether to trigger the BSR based on the UE.

The trigger mechanism of determining whether to trigger the BSR based on the UE may be the same as the trigger mechanism of LTE system explained above.

That is, for Regular BSR, the trigger mechanism is: (1) triggered if data with higher priority than those waiting in the buffer arrive or data arrive at empty buffer; (2) triggered when the retxBSR-Timer expires and there are data in the buffer. For Periodic BSR, the trigger mechanism is: triggered when the periodicBSR-Timer expires. For Padding BSR, the trigger mechanism is: may be triggered if there is still resource available after resources are allocated for to-be-transmitted data during MAC PDU construction by UE.

In some embodiments of this disclosure, in BSR reporting, BSR MAC CE may be configured by the following two forms.

1) Reporting to the network side the buffer sizes of the logical channels or logical channel groups corresponding to the master MAC entity and the secondary MAC entities through one BSR MAC CE, where a carrier corresponding to any one MAC entity of the master MAC entity and the secondary MAC entities is used in the reporting.

In the case that there is a repetition of ID among the logical channels or logical channel groups corresponding to different MAC entities, identification information may be added in the BSR MAC CE to identify a correspondence between the logical channels or logical channel groups and the MAC entities.

2) Reporting to the network side the buffer sizes of the logical channels or logical channel groups corresponding to the master MAC entity and the secondary MAC entities through a plurality of independent BSR MAC CEs in one MAC PDU, where a carrier corresponding to any one MAC entity of the master MAC entity and the secondary MAC entities is used in the reporting.

In the case that there is a repetition of ID among the logical channels or logical channel groups corresponding to different MAC entities, identification information may be added in the BSR MAC CE to identify a correspondence between the logical channels or logical channel groups and the MAC entities.

Another way of determining whether to trigger the BSR is: determining whether to trigger the BSR based on a MAC entity.

The trigger mechanism in the determining whether to trigger the BSR based on the MAC entity may be the same as the trigger mechanism of LTE system explained above, thus a repeated description thereof is omitted herein.

In some embodiments of this disclosure, in BSR reporting, BSR MAC CE may be configured by the following form.

Reporting to the network side the buffer sizes of the logical channels or logical channel groups corresponding to the master MAC entity and the secondary MAC entities by using a carrier corresponding to the MAC entity or a carrier corresponding to other MAC entity.

In the case that a carrier used in BSR MAC CE transmission is not limited and there is a repetition of ID among the logical channels or logical channel groups corresponding to different MAC entities, identification information is added in the BSR MAC CE to identify a correspondence between the logical channels or logical channel groups and the MAC entities.

In some embodiments of this disclosure, in order to make the network side aware of whether the bearer using packet duplication mode is supported by UE, optionally, prior to the UE transmitting the duplicated transmission data to the different RLC entities respectively, the method further includes: transmitting a UE capability to the network side, where the UE capability contains capability indication information indicating that the bearer using packet duplication mode is supported.

In other words, only the UE supporting the bearer using packet duplication mode may transmit data using the method for transmitting data described above.

In some embodiments of this disclosure, the method of transmitting data is applicable to data transmission using the packet duplication mode in Carrier Aggregation scenario.

Figure 6:
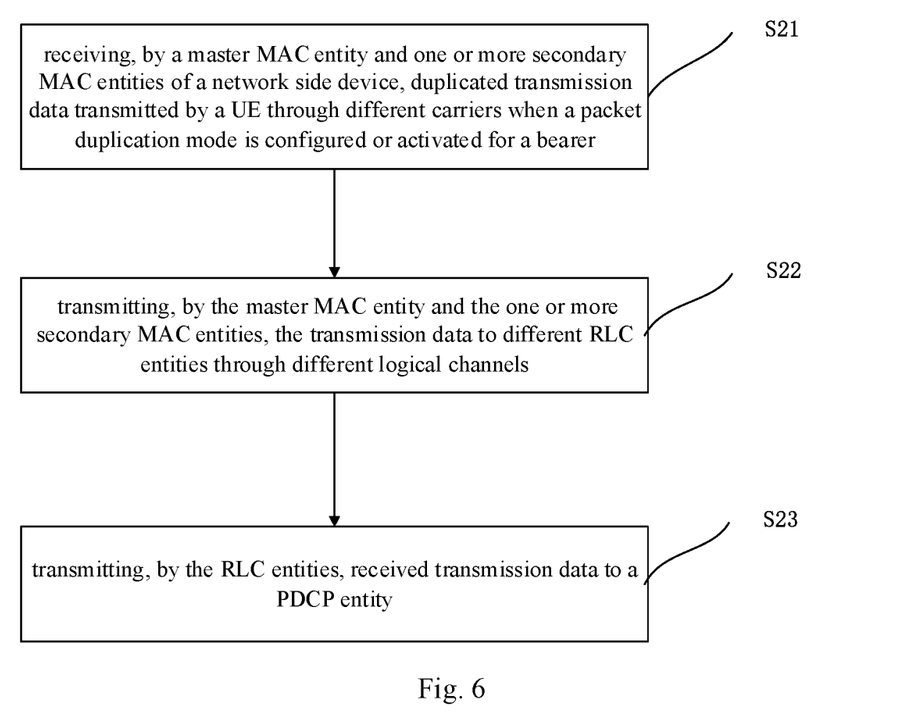
FIG. 6 is a schematic flow diagram showing a method of transmitting data applied to a network side according to some embodiments of this disclosure.

Referring to FIG. 6, a schematic flow diagram of a method of transmitting data applied to a network side according to some embodiments of this disclosure is illustrated, where the method includes the following steps.

Step S21: receiving, by a master MAC entity and one or more secondary MAC entities of a network side device, duplicated transmission data transmitted by a UE through different carriers when a packet duplication mode is configured or activated for a bearer.

Step S22: transmitting, by the master MAC entity and the one or more secondary MAC entities, the transmission data to different RLC entities through different logical channels.

Step S23: transmitting, by the RLC entities, received transmission data to a PDCP entity.

In some embodiments of this disclosure, by introducing MAC entities equal in quantity to the logical channels corresponding to the bearer for which packet duplication mode is enabled, it is guaranteed that each of the logical channels corresponding to the bearer for which packet duplication mode is enabled is scheduled and transmitted through a different MAC entity, thereby due to multiplexing gain, transmission quality following the duplication is ensured, and packet transmission latency is reduced.

In some embodiments of this disclosure, the bearer for which packet duplication mode is enabled corresponds to at least two logical channels, where each of the logical channels corresponds to one RLC entity and each of the logical channels corresponds to one MAC entity.

In some embodiments of this disclosure, duplication of transmission data may be performed by the PDCP entity or a protocol layer on top of PDCP layer.

In some embodiments of this disclosure, the first MAC entity established by the UE is called master MAC entity and other MAC entities are called secondary MAC entities.

In some embodiments of this disclosure, the secondary MAC entities may be established in one of the following conditions (but not limited thereto).

1) The secondary MAC entities are established together with the master MAC entity.

2) The secondary MAC entities corresponding to the bearer for which packet duplication mode is enabled are established when the network side configures or activates packet duplication mode for the bearer.

In the case that the secondary MAC entities are established in the condition 2), the secondary MAC entities may be released in the following condition (but not limited thereto): when the network side deconfigures or deactivates packet duplication mode for the bearer, the UE releases the secondary MAC entities corresponding to the bearer for which packet duplication mode is enabled.

3) The secondary MAC entities corresponding to the bearer for which packet duplication mode is enabled are established when the network side device configures or activates packet duplication mo for a first UE of all UEs served by the network side device.

In the case that the secondary MAC entities are established in the condition 3), the secondary MAC entities may be released in the following condition (but not limited thereto): when packet duplication mode for a last bearer for which packet duplication mode is enabled of all bearers served by the network side device is deconfigured or deactivated, releasing the secondary MAC entities corresponding to the bearer for which packet duplication mode is enabled.

In some embodiments of this disclosure, the UE and the network side are kept in conformity in regard to the establishment or release mode of the secondary MAC entities, where the conformity may be maintained through protocol specification or signaling notification.

In some embodiments of this disclosure, the method of transmitting data further includes: in the case that packet duplication mode for the bearer is configured or activated, configuring semi-statically or dynamically a mapping between the carriers and the master MAC entity and the secondary MAC entities, and transmitting the mapping to the UE.

Optionally, in the case that the network side configures semi-statically the mapping between the carriers and the master MAC entity and the secondary MAC entities and transmits the mapping to the UE, the mapping may be transmitted to the UE through RRC signaling semi-statically.

Optionally, in the case that the network side configures dynamically the mapping between the carriers and the master MAC entity and the secondary MAC entities and transmits the mapping to the UE, the mapping may be transmitted to the UE through L1/L2 signaling dynamically.

In some embodiments of this disclosure, the method for transmitting data further includes: in the case that packet duplication mode for the bearer is configured or activated, configuring semi-statically or dynamically a mapping between the logical channels and the master MAC entity and the secondary MAC entities or a mapping between the logical channels and the carriers, and transmitting the mapping to the UE.

Optionally, in the case that the network side configures semi-statically the mapping between the logical channels and the master MAC entity and the secondary MAC entities or the mapping between the logical channels and the carriers and transmits the mapping to the UE, the mapping may be transmitted to the UE through RRC signaling semi-statically.

Optionally, in the case that the network side configures dynamically the mapping between the logical channels and the master MAC entity and the secondary MAC entities or the mapping between the logical channels and the carriers and transmits the mapping to the UE, the mapping may be transmitted to the UE through L1/L2 signaling dynamically.

In some embodiments of this disclosure, the master MAC entity and the secondary MAC entities may be used according to one of the following rules (but not limited thereto).

1) Both the master MAC entity and the secondary MAC entities are configured to bear a logical channel corresponding to a bearer for which packet duplication mode is not configured or activated and logical channels corresponding to a bearer for which packet duplication mode is configured or activated.

In this case, optionally, when one of the secondary MAC entities is released, the logical channel corresponding to the bearer for which packet duplication mode is not configured or activated that is borne on the released MAC entity is automatically transferred to be borne on the master MAC entity, with no additional signaling configuration required.

2) The master MAC entity is configured to bear a logical channel corresponding to a bearer for which packet duplication mode is not configured or activated and logical channels corresponding to a bearer for which packet duplication mode is configured or activated; and the secondary MAC entities are configured to only bear logical channels corresponding to a bearer for which packet duplication mode is configured or activated.

In some embodiments of this disclosure, prior to transmitting the transmission data to the network side device, the UE may perform a BSR reporting. That is, in some embodiments of this disclosure, the method of transmitting data may further include: receiving buffer sizes, reported by the UE, of the logical channels or logical channel groups corresponding to the master MAC entity and the secondary MAC entities of the UE, and performing uplink resource scheduling based on the buffer sizes of the logical channels or logical channel groups corresponding to the master MAC entity and the secondary MAC entities of the UE.

In some embodiments of this disclosure, prior to the network side configuring or activating packet duplication mode for the bearer, the method may further include: receiving a UE capability transmitted by the UE, where the UE capability contains capability indication information indicating that the bearer using packet duplication mode is supported.

That is, optionally, the network side won't configure or activate packet duplication mode for the bearer between the network side and the UE, until the capability indication information, transmitted by the UE, indicating that the bearer using packet duplication mode is supported is received by the network side.

Based on the same inventive concept, this disclosure further provides a UE.

Figure 7:
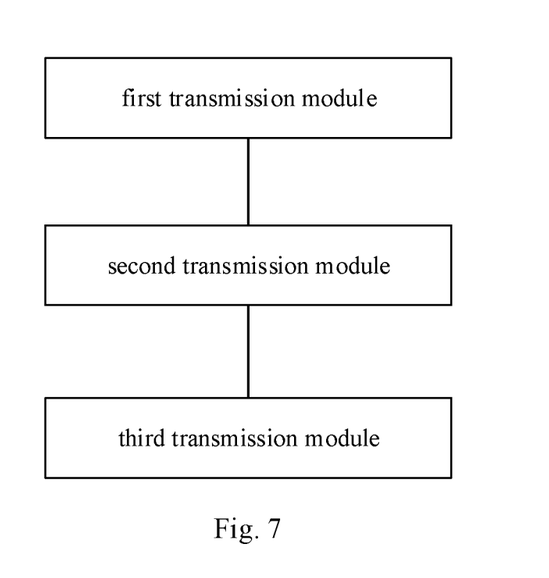
FIG. 7 is a structural block diagram of a UE according to some embodiments of this disclosure.

Referring to FIG. 7, a structural block diagram of a UE according to some embodiments of this disclosure is illustrated, where the UE includes: a first transmission module, configured to transmit duplicated transmission data to different RLC entities respectively when a network side configures or activates packet duplication mode for a bearer; a second transmission module, configured to trigger one of the different RLC entities to transmit the transmission data through one of logical channels to a master MAC entity and trigger the others of the different RLC entities to transmit the transmission data through different logical channels to different secondary MAC entities; and a third transmission module, configured to trigger the master MAC entity and the one or more secondary MAC entities to transmit the transmission data through different carriers to the network side.

In some embodiments of this disclosure, by introducing MAC entities equal in quantity to the logical channels corresponding to the bearer for which packet duplication mode is enabled, it is guaranteed that each of the logical channels corresponding to the bearer for which packet duplication mode is enabled is scheduled and transmitted through a different MAC entity, thereby due to multiplexing gain, transmission quality following the duplication is ensured, and packet transmission latency is reduced.

In some embodiments of this disclosure, the bearer for which packet duplication mode is enabled corresponds to at least two logical channels, where each of the logical channels corresponds to one RLC entity and each of the logical channels corresponds to one MAC entity.

In some embodiments of this disclosure, the first MAC entity established by the UE may be called master MAC entity and other MAC entities may be called secondary MAC entities.

In some embodiments of this disclosure, the secondary MAC entities may be established using one of the following two modules of UE (but not limited thereto).

A first establishment module is configured to establish the one or more secondary MAC entities together with the master MAC entity.

A second establishment module is configured to, in the case that the network side configures or activates packet duplication mode for the bearer, establish the one or more secondary MAC entities corresponding to the bearer for which packet duplication mode is enabled.

In the case that the secondary MAC entities are established by the second establishment module, the UE may further include: a releasing module, configured to, in the case that the network side deconfigures or deactivates packet duplication mode for the bearer, release the secondary MAC entities corresponding to the bearer for which packet duplication mode is enabled.

In order to acquire a mapping between the carriers and the master MAC entity and the one or more secondary MAC entities, the UE may further include: a first reception module, configured to receive the mapping between the carriers and the master MAC entity and the one or more secondary MAC entities that is configured by the network side semi-statically or dynamically.

In order to acquire a mapping between the logical channels and the master MAC entity and the one or more secondary MAC entities or a mapping between the logical channels and the carriers, the UE may further include: a second reception module, configured to receive the mapping between the logical channels and the master MAC entity and the one or more secondary MAC entities or the mapping between the logical channels and the carriers that is configured by the network side semi-statically or dynamically.

In some embodiments of this disclosure, the master MAC entity and the secondary MAC entities may be used according to one of the following rules (but not limited thereto).

1) Both the master MAC entity and the secondary MAC entities are configured to bear a logical channel corresponding to a bearer for which packet duplication mode is not configured or activated and logical channels corresponding to a bearer for which packet duplication mode is configured or activated.

In this case, optionally, the UE may further include: a transferring module, configured to, in the case that one of the one or more secondary MAC entities is released, automatically transfer the logical channel corresponding to the bearer for which packet duplication mode is not configured or activated that is borne on the released secondary MAC entity to be borne on the master MAC entity.

2) The master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

In some embodiments of this disclosure, prior to transmitting the transmission data to the network side device, the UE may perform a BSR reporting first, where the UE may further include: a determination module, configured to determine whether to trigger a BSR; and a reporting module, configured to, in the case that it is determined the BSR is to be triggered, report to the network side buffer sizes of the logical channels or logical channel groups corresponding to the master MAC entity and the one or more secondary MAC entities.

In some embodiments of this disclosure, the determination module may determine whether to trigger the BSR based on the UE, where the reporting module may be further configured to report to the network side the buffer sizes of the logical channels or logical channel groups corresponding to the master MAC entity and the one or more secondary MAC entities by using a carrier corresponding to any one MAC entity of the master MAC entity and the one or more secondary MAC entities.

Further, the reporting module may be configured to report to the network side the buffer sizes of the logical channels or logical channel groups corresponding to the master MAC entity and the one or more secondary MAC entities through one BSR MAC CE.

Alternatively, the reporting module may be further configured to report to the network side the buffer sizes of the logical channels or logical channel groups corresponding to the master MAC entity and the one or more secondary MAC entities through a plurality of independent BSR MAC CEs in one MAC PDU.

In some embodiments of this disclosure, the determination module may determine whether to trigger the BSR based on a MAC entity, where the reporting module may be further configured to report to the network side the buffer sizes of the logical channels or logical channel groups corresponding to the master MAC entity and the one or more secondary MAC entities by using a carrier corresponding to the MAC entity or a carrier corresponding to other MAC entity.

Further, the reporting module is configured to, in the case that a carrier used in BSR MAC CE transmission is not limited and there is a repetition of ID among the logical channels or logical channel groups corresponding to different MAC entities, add identification information in the BSR MAC CE to identify a correspondence between the logical channels or logical channel groups and the MAC entities.

In order to make the network side aware of whether the bearer using packet duplication mode is supported by UE, optionally, in some embodiments of this disclosure, the UE may further include: a UE capability transmission module, configured to transmit a UE capability to the network side, where the UE capability contains capability indication information indicating that the bearer using packet duplication mode is supported.

Based on the same inventive concept, some embodiments of this disclosure further provide a network side device.

Figure 8:
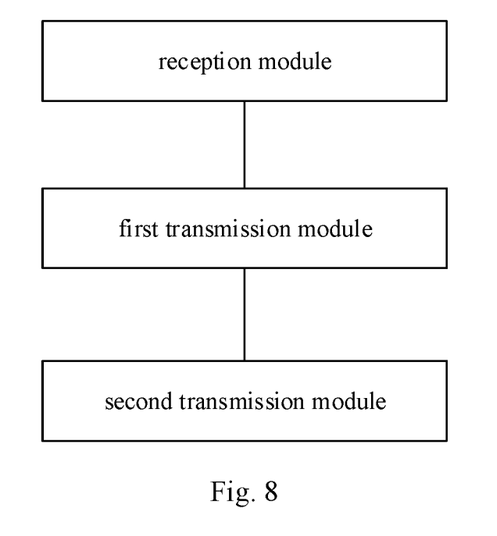
FIG. 8 is a structural block diagram of a network side device according to some embodiments of this disclosure.

Referring to FIG. 8, a structural block diagram of a network side device according to some embodiments of this disclosure is illustrated, where the network side device includes: a reception module, configured to trigger a master MAC entity and one or more secondary MAC entities to respectively receive duplicated transmission data transmitted by a UE through different carriers when packet duplication mode for a bearer is configured or activated; a first transmission module, configured to trigger the master MAC entity and the one or more secondary MAC entities to transmit the transmission data to different RLC entities through different logical channels; and a second transmission module, configured to trigger the RLC entities to transmit received transmission data to a PDCP entity.

In some embodiments of this disclosure, the bearer for which packet duplication mode is enabled corresponds to at least two logical channels, where each of the logical channels corresponds to one RLC entity and each of the logical channels corresponds to one MAC entity.

In some embodiments of this disclosure, duplication of transmission data may be performed by the PDCP entity or a protocol layer on top of PDCP layer.

That is, the UE may further include: a bearer duplication module, configured to trigger the PDCP entity or a protocol layer on top of PDCP layer to perform bearer duplication.

In some embodiments of this disclosure, the secondary MAC entities may be established using one of the following three modules of the network side device.

A first establishment module is configured to establish the one or more secondary MAC entities together with the master MAC entity.

A second establishment module is configured to establish the one or more secondary MAC entities corresponding to the bearer for which packet duplication mode is enabled when the packet duplication mode for the bearer is configured or activated.

A third establishment module is configured to establish the one or more secondary MAC entities corresponding to the bearer for which packet duplication mode is enabled when the packet duplication mode for a first UE of all UEs served by the network side device is configured or activated.

In the case that the one or more secondary MAC entities are established by the second establishment module, the network side device may further include: a first releasing module, configured to, in the case that packet duplication mode for the bearer is deconfigured or deactivated, release the one or more secondary MAC entities corresponding to the bearer for which packet duplication mode is configured or activated.

In the case that the one or more secondary MAC entities are established by the third establishment module, the network side device may further include: a second releasing module, configured to, in the case that packet duplication mode for a last bearer for which packet duplication mode is configured or activated of all bearers served by the network side device is deconfigured or deactivated, release the one or more secondary MAC entities corresponding to the bearer for which packet duplication mode is enabled.

In order to inform a UE of a mapping between the carriers and the master MAC entity and the one or more secondary MAC entities, the network side device may further include: a first configuration module, configured to, in the case that packet duplication mode for the bearer is configured or activated, configure semi-statically or dynamically the mapping between the carriers and the master MAC entity and the one or more secondary MAC entities, and transmit the mapping to the UE.

In order to inform a UE of a mapping between the logical channels and the master MAC entity and the one or more secondary MAC entities or a mapping between the logical channels and the carriers, the network side device may further include: a second configuration module, configured to, in the case that packet duplication mode for the bearer is configured or activated, configure semi-statically or dynamically the mapping between the logical channels and the master MAC entity and the one or more secondary MAC entities or the mapping between the logical channels and the carriers, and transmit the mapping to the UE.

In some embodiments of this disclosure, the master MAC entity and the secondary MAC entities may be used according to one of the following rules (but not limited thereto).

1) Both the master MAC entity and the secondary MAC entities are configured to bear a logical channel corresponding to a bearer for which packet duplication mode is not configured or activated and logical channels corresponding to a bearer for which packet duplication mode is configured or activated.

In this case, optionally, the network side device may further include: a transferring module, configured to, in the case that one of the one or more secondary MAC entities is released, automatically transfer the logical channel corresponding to the bearer for which packet duplication mode is not configured or activated that is borne on the released secondary MAC entity to be borne on the master MAC entity.

2) The master MAC entity is configured to bear a logical channel corresponding to a bearer for which packet duplication mode is not configured or activated and logical channels corresponding to a bearer for which packet duplication mode is configured or activated; and the one or more secondary MAC entities are configured to only bear logical channels corresponding to a bearer for which packet duplication mode is configured or activated.

In some embodiments of this disclosure, prior to transmitting the transmission data to the network side device, the UE may perform a BSR reporting first, where the network side device may further include: a scheduling module, configured to receive buffer sizes, reported by the UE, of the logical channels or logical channel groups corresponding to the master MAC entity and the one or more secondary MAC entities of the UE, and perform uplink resource scheduling based on the buffer sizes of the logical channels or logical channel groups corresponding to the master MAC entity and the one or more secondary MAC entities of the UE.

In order to make the network side aware of whether the bearer using packet duplication mode is supported by UE, optionally, a UE supporting a bearer for which packet duplication mode is enabled may transmit to the network side a UE capability containing capability indication information indicating that the bearer using packet duplication mode is supported; correspondingly, the network side device may further include: a UE capability reception module, configured to receive a UE capability transmitted by the UE, where the UE capability contains capability indication information indicating that the bearer using packet duplication mode is supported.

Some embodiments of this disclosure further provide an apparatus for processing data, including: a processor and a memory connected to the processor through a bus interface, where the memory is configured to store program and data being used by the processor in operation, and the processor is configured to call and execute the program and data stored in the memory to implement the following functional modules or units: a first transmission module, configured to transmit duplicated transmission data to different RLC entities respectively when a network side configures or activates packet duplication mode for a bearer; a second transmission module, configured to trigger one of the different RLC entities to transmit the transmission data through one of logical channels to a master MAC entity and trigger each of the others of the different RLC entities to transmit the transmission data through a different logical channel to a different secondary MAC entity; and a third transmission module, configured to trigger the master MAC entity and the secondary MAC entity to transmit the transmission data through different carriers to the network side.

Some embodiments of this disclosure further provide an apparatus for processing data, including: a processor and a memory connected to the processor through a bus interface, where the memory is configured to store program and data being used by the processor in operation, and the processor is configured to call and execute the program and data stored in the memory to implement the following functional modules or units: a reception module, configured to trigger a master MAC entity and one or more secondary MAC entities to respectively receive duplicated transmission data transmitted by a UE through different carriers when packet duplication mode for a bearer is configured or activated; a first transmission module, configured to trigger the master MAC entity and the one or more secondary MAC entities to transmit the transmission data to different RLC entities through different logical channels; and a second transmission module, configured to trigger the RLC entities to transmit received transmission data to a PDCP entity.

It is noted, the apparatuses provided in some embodiments of this disclosure are capable of implementing the corresponding methods of transmitting data provided in the abovementioned method embodiments, thus all embodiments of the methods of transmitting data provided in the abovementioned method embodiments may be applied correspondingly to the two apparatus embodiments described above and achieve the same or similar advantageous effects.

Some embodiments of this disclosure further provide a computer readable storage medium storing therein a computer program, wherein the computer program is configured to be executed by a processor, to implement steps of the method of transmitting data described in any one of abovementioned embodiments.

The computer readable storage medium includes permanent and non-permanent, removable and non-removable media, and may achieve information storage by any means or techniques. Information may be computer readable instruction, data structure, program module or other data. Computer storage medium may, for example, include, but not limited to: Phase Change Random Access Memory (PRAM), Static Random Access Memory (SRAM), Dynamic Random Access Memory (DRAM), other types of Random Access Memories (RAM), Read Only Memory (ROM), Electrically Erasable Programmable Read Only Memory (EEPROM), FLASH or other memory technologies, Compact Disc Read Only Memory (CD-ROM), Digital Versatile Disc (DVD) or other optical storages, cassette tape, magnetic tape, magnetic disk or other magnetic storage device or any other non-transmitting medium, which is configured to store information accessible by a computing device. According to the definition herein, the computer readable medium does not include transitory media, such as modulated data signals and carriers.

Some embodiments of this disclosure further provide a UE, including a processor and a memory, where the processor is configured to read and execute a program stored in the memory to implement steps of the abovementioned method of transmitting data applied to the UE side.

Some embodiments of this disclosure further provide a network side device, including a processor and a memory, where the processor is configured to read and execute a program stored in the memory to implement steps of the abovementioned method for transmitting data applied to the network side.

In the embodiments provided in this disclosure, it should be understood that the disclosed method and apparatus may be implemented in other manners. For example, the described apparatus embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, various functional units in the embodiments of this disclosure may be integrated into one processing unit, or each of the units may exist alone physically. Alternatively, two or more these functional units may be integrated into one unit. The above integrated unit may be implemented in form of hardware, or may be implemented in form of a combination of hardware and software functional unit.

The integrated units implemented in form of software functional unit may be stored in a computer-readable storage medium. The software functional unit is stored in a storage medium, and includes several instructions for instructing a computer device (which may be a personal computer, a server, or a network device) to perform a part of the steps of the transmitting and receiving methods described in the embodiments of this disclosure. The foregoing storage medium includes any medium that can store program code, such as a Universal Serial Bus (USB) flash drive, a removable hard disk, a Read-Only Memory (ROM), a Random Access Memory (RAM), a magnetic disk, or an optical disc.

The above descriptions merely describe some implementations of this disclosure. It is appreciated, modifications and improvements may be made by a person of ordinary skill in the art without departing from the principle of this disclosure, and these modifications and improvements shall fall within the scope of this disclosure.

What is claimed is:

1. A method of transmitting data applied to a user equipment (UE), comprising:
   transmitting, by the UE, duplicated transmission data to different radio link control (RLC) entities respectively when a network side configures or activates a packet duplication mode for a bearer;
   transmitting, by one of the different RLC entities, the transmission data through one of logical channels to a master medium access control (MAC) entity and transmitting, by each of the others of the different RLC entities, the transmission data through a different one of the logical channels to a different one of one or more secondary MAC entities; and
   transmitting, by the master MAC entity and the one or more secondary MAC entities, the transmission data to the network side through different carriers;
   wherein prior to the transmitting, by the UE, the duplicated transmission data to the different RLC entities respectively, the method further comprises:
   transmitting a UE capability to the network side, the UE capability carrying capability indication information indicating whether a packet duplication is supported or not;
   wherein prior to the transmitting, by the UE, the duplicated transmission data to the different RLC entities respectively, the method further comprises:

receiving a mapping between the carriers and the master MAC entity and the one or more secondary MAC entities that is configured by the network side semi-statically or dynamically; or receiving a mapping between the logical channels and the carriers that is configured by the network side semi-statically or dynamically;

wherein both the master MAC entity and the one or more secondary MAC entities are configured to bear a logical channel corresponding to a bearer for which packet duplication mode is not configured or packet duplication mode is not activated and the logical channels corresponding to a bearer for which packet duplication mode is configured or activated;

wherein when one of the one or more secondary MAC entities is released, the logical channel corresponding to the bearer for which packet duplication mode is not configured or packet duplication mode is not activated that is borne on the released one of the one or more secondary MAC entities is automatically transferred to be borne on the master MAC entity.

2. The method according to claim 1, wherein each of the logical channels corresponds to one RLC entity and each of the logical channels corresponds to one MAC entity.

3. The method according to claim 1, wherein the one or more secondary MAC entities are established together with the master MAC entity.

4. The method according to claim 1, further comprising:
establishing, by the UE, the one or more secondary MAC entities corresponding to the bearer for which packet duplication mode is configured or activated when the network side configures or activates the packet duplication mode for the bearer.

5. The method according to claim 4, further comprising:
releasing, by the UE, the one or more secondary MAC entities corresponding to the bearer for which packet duplication mode is configured or activated when the network side deconfigures or deactivates the packet duplication mode for the bearer.

6. The method according to claim 1, wherein
the master MAC entity is configured to bear a logical channel corresponding to a bearer for which packet duplication mode is not configured or packet duplication mode is not activated and the logical channels corresponding to a bearer for which packet duplication mode is configured or activated; and
the one or more secondary MAC entities are configured to only bear logical channels corresponding to a bearer for which packet duplication mode is configured or packet duplication mode is not activated.

7. The method according to claim 1, further comprising:
determining whether to trigger a buffer state reporting (BSR); and
reporting to the network side buffer sizes of the logical channels or logical channel groups corresponding to the master MAC entity and the one or more secondary MAC entities when it is determined the BSR is to be triggered.

8. The method according to claim 7, wherein the determining whether to trigger the BSR is performed based on the UE.

9. The method according to claim 8, wherein the reporting to the network side the buffer sizes of the logical channels or the logical channel groups corresponding to the master MAC entity and the one or more secondary MAC entities comprises:

reporting to the network side the buffer sizes of the logical channels or the logical channel groups corresponding to the master MAC entity and the one or more secondary MAC entities by using a carrier corresponding to any one MAC entity of the master MAC entity and the one or more secondary MAC entities.

10. The method according to claim 9, wherein the reporting to the network side the buffer sizes of the logical channels or the logical channel groups corresponding to the master MAC entity and the one or more secondary MAC entities comprises:
reporting to the network side the buffer sizes of the logical channels or the logical channel groups corresponding to the master MAC entity and the one or more secondary MAC entities through one BSR MAC control element (CE); or
reporting to the network side the buffer sizes of the logical channels or the logical channel groups corresponding to the master MAC entity and the one or more secondary MAC entities through a plurality of BSR MAC CEs in one MAC protocol data unit (PDU).

11. The method according to claim 10, wherein the reporting to the network side the buffer sizes of the logical channels or the logical channel groups corresponding to the master MAC entity and the one or more secondary MAC entities comprises:
adding identification information in the BSR MAC CE to identify a correspondence between the logical channels or the logical channel groups and the master MAC entity and the one or more secondary MAC entities when a carrier used in BSR MAC CE transmission is not limited and there is a repetition of Identity (ID) among the logical channels or the logical channel groups corresponding to different MAC entities.

12. The method according to claim 7, wherein the determining whether to trigger the BSR is performed based on a MAC entity.

13. The method according to claim 12, wherein the reporting to the network side the buffer sizes of the logical channels or the logical channel groups corresponding to the master MAC entity and the one or more secondary MAC entities comprises:
reporting to the network side the buffer sizes of the logical channels or the logical channel groups corresponding to the master MAC entity and the one or more secondary MAC entities by using a carrier corresponding to the MAC entity or a carrier corresponding to other MAC entity.

14. A user equipment (UE), comprising a processor and a memory, wherein the processor is configured to read and execute a program stored in the memory to implement steps of the method according to claim 1.

15. A method of transmitting data applied to a network side device, comprising:
receiving, by a master medium access control (MAC) entity and one or more secondary MAC entities of a network side device, duplicated transmission data transmitted by a user equipment (UE) through different carriers when a packet duplication mode is configured or activated for a bearer;
transmitting, by the master MAC entity and the one or more secondary MAC entities, the transmission data to different radio link control (RLC) entities through different logical channels; and
transmitting, by the RLC entities, received transmission data to a Packet Data Convergence Protocol (PDCP) entity;

wherein before the packet duplication mode is configured or activated for the bearer, the method further comprises:

receiving a UE capability sent by the UE, the UE capability carrying capability indication information indicating whether a packet duplication is supported or not;

wherein before the packet duplication mode is configured or activated for the bearer, the method further comprises:

configuring semi-statically or dynamically a mapping between the carriers and the master MAC entity and the secondary MAC entities, and transmitting the mapping to the UE;

or configuring semi-statically or dynamically a mapping between the logical channels and the carriers, and transmitting the mapping to the UE;

wherein both the master MAC entity and the one or more secondary MAC entities are configured to bear a logical channel corresponding to a bearer for which packet duplication mode is not configured or packet duplication mode is not activated and the logical channels corresponding to a bearer for which packet duplication mode is configured or activated;

wherein when one of the one or more secondary MAC entities is released, the logical channel corresponding to the bearer for which packet duplication mode is not configured or packet duplication mode is not activated that is borne on the released one of the one or more secondary MAC entities is automatically transferred to be borne on the master MAC entity.

16. A network side device, comprising a processor and a memory, wherein the processor is configured to read and execute a program stored in the memory to implement steps of the method according to claim 15.

* * * * *